United States Patent
LeMoigne-Stewart et al.

(10) Patent No.: US 8,355,579 B2
(45) Date of Patent: Jan. 15, 2013

(54) AUTOMATIC EXTRACTION OF PLANETARY IMAGE FEATURES

(75) Inventors: Jacqueline J. LeMoigne-Stewart, Bowie, MD (US); Giulia Troglio, Genoa (IT); Jon A. Benediktsson, Reykjavik (IS); Sebastiano B. Serpico, Genoa (IT); Gabriele Moser, Varazze (IT)

(73) Assignee: The United states of America as represented by the Administrator of the National Aeronautics and Space Administration, Washington, DC (US)

( * ) Notice: Subject to any disclaimer, the term of this patent is extended or adjusted under 35 U.S.C. 154(b) by 353 days.

(21) Appl. No.: 12/783,054

(22) Filed: May 19, 2010

(65) Prior Publication Data

US 2011/0026832 A1    Feb. 3, 2011

Related U.S. Application Data

(60) Provisional application No. 61/179,774, filed on May 20, 2009.

(51) Int. Cl.
*G06K 9/46* (2006.01)
*G06K 9/48* (2006.01)
*G06K 9/34* (2006.01)
*G06K 9/36* (2006.01)

(52) U.S. Cl. ......... 382/190; 382/199; 382/173; 382/281

(58) Field of Classification Search .................. 382/109, 382/100, 281, 173
See application file for complete search history.

(56) References Cited

U.S. PATENT DOCUMENTS

| 7,575,171 B2 * | 8/2009 | Lev ............................... 235/470 |
| 7,738,683 B2 * | 6/2010 | Cahill et al. .................. 382/128 |
| 2006/0204953 A1 * | 9/2006 | Ptitsyn .............................. 435/4 |
| 2009/0048780 A1 * | 2/2009 | Caballero et al. ............. 701/226 |
| 2009/0081775 A1 * | 3/2009 | Hodneland et al. ........ 435/317.1 |

OTHER PUBLICATIONS

Harada, N.; Hayashi, T.; Hirata, N.; Demura, H.; Asada, N.; , "Recognition Algorithm for Topographic Features," Computer and Information Technology, 2007. CIT 2007. 7th IEEE International Conference on , vol., No., pp. 685-689, Oct. 16-19, 2007.*
Heather Dunlop "A New Method for Crater Detection" Nov. 2, 2006. http://dunlop1.net/doc/craters.pdf.*
Flores-Mendez, "Crater Marking and Classification Using Computer Vision," Progress in Pattern Recognition, Speech and Image Analysis, Lecture Notes in Computer Science, 2003, pp. 79-86 vol. 2905 Springer-Verlag, NY.
J.R. Kim, et al. , "Automated Crater Detection, a New Tool for Mars Cartography and Chronology," Photogrammetric Engineering & Remote Sensing, 2005, pp. 13-22 vol. 71, No. 10.

(Continued)

*Primary Examiner* — Bhavesh Mehta
*Assistant Examiner* — Utpal Shah

(57) ABSTRACT

A method for the extraction of Lunar data and/or planetary features is provided. The feature extraction method can include one or more image processing techniques, including, but not limited to, a watershed segmentation and/or the generalized Hough Transform. According to some embodiments, the feature extraction method can include extracting features, such as, small rocks. According to some embodiments, small rocks can be extracted by applying a watershed segmentation algorithm to the Canny gradient. According to some embodiments, applying a watershed segmentation algorithm to the Canny gradient can allow regions that appear as close contours in the gradient to be segmented.

21 Claims, 6 Drawing Sheets

OTHER PUBLICATIONS

A. Smirnov, "Exploratory Study of Automated Crater Detection Algorithm," Tech. Rep., 2002, CO.

S. Beucher, "The Watershed Transformation Applied to Image Segmentation," Scanning Microscopy International, 1992.

S. Tsuji, et al., "Detection of Ellipses by a Modified Hough Transformation," IEEE Trans. on Computers, 27(8), 1978.

Shapiro, L.G. et al., "Computer Vision", Prentice Hall, 2001.

J. Canny, "A Computational Approach to Edge Detection," IEEE—Trans. Pattern Analysis & Machine Intelligence, 10 (6), 1986.

R. Duda et al., "Use of the Hough Transform to Detect Lines and Curves in Pictures," Communications of the Association for Computing Machinery, 15, 1972.

Z. Michalewicz, "Genetic Algorithms + Data Structures = Evolutional Programs", Berlin Heidelberg, 3rd Edition, 1999 Springer Verlag.

Y. Sawabe et al., "Automated Detection and Classification of Lunar Craters Using Multiple Approaches," Adv. Space Res., 2006, pp. 21-27, vol. 37, No. 1.

J. Earl et al., "Automatic Recognition of Crater-Like Structures in Terrestrial and Planetary Images," Proc. Lunar Planetary Science XXXVI, 2005, Abs. No. 1319, TX.

"Lunar Reconnaissance Orbiter," NASA Facts Goddard Space Flight Center, National Aeronautics and Space Administration http://lro.gsfc.nasa.gov/mission.html, 2009.

\* cited by examiner

AUTOMATIC EXTRACTION OF PLANETARY IMAGE FEATURES

CROSS-REFERENCE TO RELATED APPLICATION

The present application claims a benefit from prior U.S. Patent Application No. 61/179,774, filed May 20, 2009, which is incorporated herein in its entirety by reference.

STATEMENT OF GOVERNMENT INTEREST

The invention described herein was at least in-part made by an employee of the United States Government and may be manufactured and used by or for the Government of the United States of America for governmental purposes without the payment of any royalties thereon or therefor.

FIELD

The present invention relates generally to the field of automatically extracting features for the purpose of, for example, evaluating and comparing images, and particularly, lunar and/or planetary images.

BACKGROUND

With the launch of several Lunar missions, such as Lunar Reconnaissance Orbiter (LRO) and Chandrayaan-1, a large amount of Lunar images will be and are being acquired, and will need to be analyzed. When registering or analyzing lunar data, significant features need to be extracted from the image data. Planetary features, such as rocks, boulders, craters or ridges, are then used for applications such as: registering multi-temporal, multi-sensor, multi-view images; creating an obstacle distribution map for site selection or path planning purposes; or performing terrain categorization. Although many automatic feature extraction methods have been proposed and utilized for Earth remote sensing images, these methods are not always applicable to Lunar data that often present low contrast and uneven illumination characteristics.

The LRO is a NASA mission, aimed at creating a comprehensive atlas of the Moon features and resources to aid in the design of a lunar outpost and to prepare exploration and scientific missions to the Moon. LRO is scheduled to spend at least one year in orbit collecting detailed information about the Moon and its environment. Different types of data will be collected by LRO (and other Moon missions) at different times, by different sensors, and from different view-points. Therefore, registration will be used to jointly exploit, integrate, or compare these different data, and feature extraction is the first step to not only image registration, but also any further analysis of these data.

The identification of the features that are present on the planetary surface by a human expert is a time-consuming endeavor. Therefore, a trustworthy automatic procedure to detect the position, structure, and dimension of each feature is highly desirable. This is a difficult task because limited data are available, the quality of the images is generally low (i.e., it depends on illumination and surface properties), and the features that are present in the images can be barely visible due to erosion and exhibit different structures and variable sizes.

Among typical features in Lunar- and planet-surface imagery, craters play a primary role. The crater detection problem has been widely addressed and different approaches have been proposed in the literature. The image-based approaches for crater detection can be divided into two main categories: supervised and unsupervised. The supervised methods require the input of an expert and generally use machine learning concepts to train the algorithm to feature extraction. Unsupervised methods are completely automatic and are generally based on pattern recognition techniques. Different approaches have been proposed, based on template matching, texture analysis, neural networks, or a combination of these techniques. Template matching has been described in A. Flores-Mendez, "Crater marking and classification using computer vision," in Progress in Pattern Recognition, Speech and Image Analysis, vol. 2905, Lecture Notes in Computer Science. New York: Springer-Verlag, 2003, pp. 79-86, which is incorporated herein in its entirety by reference. Texture analysis has been described in J. R. Kim, J.-P. Muller, S. van Gasselt, J. G. Morley, and G. Neukum, "Automated crater detection, a new tool for Mars cartography and chronology," Photogramm. Eng. Remote Sensing, vol. 71, no. 10, pp. 13-22, 2000, which is incorporated herein in its entirety by reference. Neural networks have been described in A. A. Smirnov, "Exploratory study of automated crater detection algorithm," Boulder, Colo., 2002. Tech. Rep., which is incorporated herein in its entirety by reference.

Compared to Earth Science remote sensing data, lunar images usually present very low contrast and uneven illumination. The boundary of lunar features is not well defined, and it is therefore somewhat difficult to segment and characterize lunar images. Also, because of uneven illumination, edges extracted from lunar images do not form closed contours, and post-processing needs to be done to link these edges. Further, because regions are difficult to characterize due to lack of contrast, if a method such as region growing is used, one level of iteration is not sufficient to describe all the features. With the large number of new lunar data that will be collected in the next few years, it is important to design an automated method to extract these features, and to perform tasks such as image registration. As such, an automated and robust feature extraction method for lunar images is needed.

SUMMARY

According to various embodiments of the present teachings, a feature extraction method is provided, for example, for the extraction of Lunar data and/or planetary features. This feature extraction method can be used for extraction of features, even when planetary images are blurry, noisy, present a lack of contrast and/or uneven illumination, and/or when the represented images are not well-defined. According to some embodiments, the feature extraction method can include computing an image gradient. The image gradient can be computed using a Canny edge detector.

According to various embodiments, the feature extraction method can include one or more image processing techniques, including, but not limited to, a watershed segmentation and/or the generalized Hough Transform. According to some embodiments, the feature extraction method can include extracting features, such as, small rocks. According to some embodiments, small rocks can be extracted by applying a watershed segmentation algorithm to the Canny gradient. According to some embodiments, applying a watershed segmentation algorithm to the Canny gradient can allow regions that appear as close contours in the gradient to be segmented.

According to some embodiments, the feature extraction method can include extracting features, such as, large rocks and/or craters of elliptical shape. According to some embodiments, large rocks and/or craters of elliptical shape can be extracted by applying a generalized Hough accumulator to detect ellipses in the gradient image, and then applying the watershed segmentation using these ellipses as seed points.

According to some embodiments, the feature extraction method can include detecting ridges. According to some embodiments, ridges can be detected by applying a standard Hough accumulator to detect straight lines in the gradient image.

According to various embodiments, the feature extraction method can have many applications, which can include image registration. The feature extraction method can be generalized to other planetary images as well as to Lunar images.

BRIEF DESCRIPTION OF THE DRAWINGS

The present teachings will be described with reference to the accompanying drawings. The drawings are intended to illustrate, not limit, the present teachings.

DETAILED DESCRIPTION OF THE PRESENT INVENTION

Figure 1:
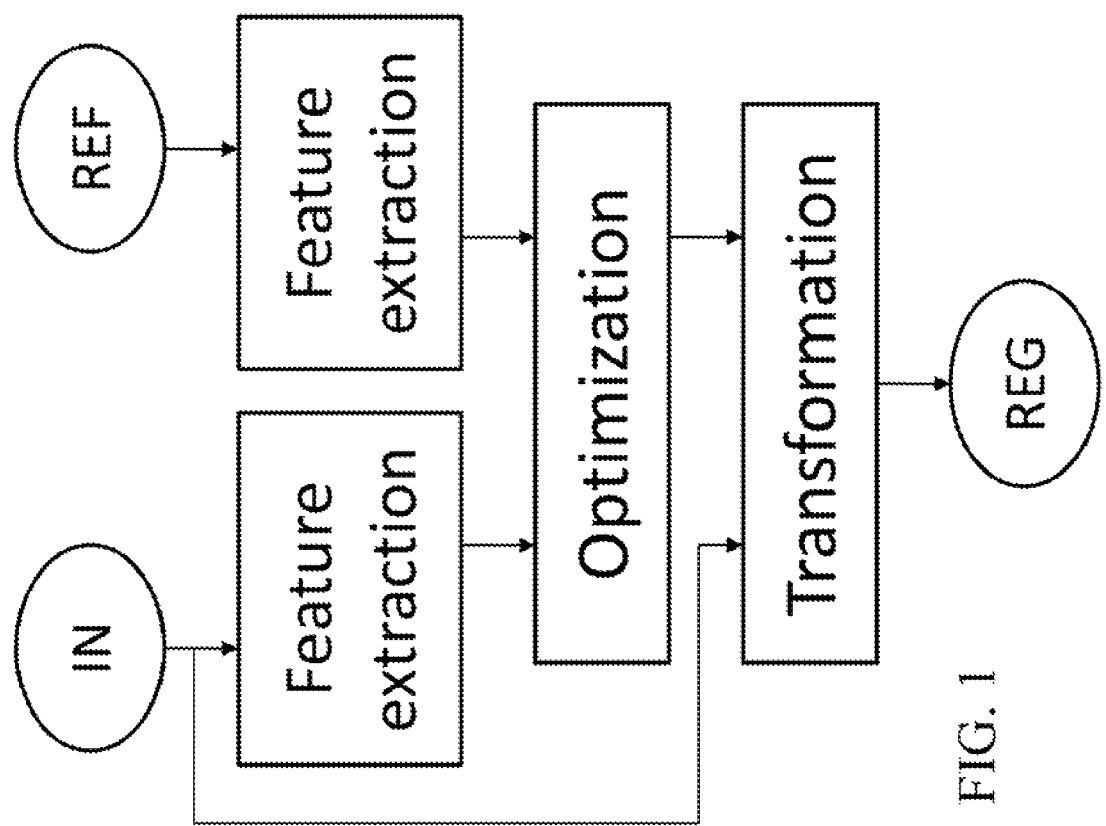
FIG. 1 shows a flowchart for registering input and reference images.

According to various embodiments, a feature extraction method is provided that includes computing an image gradient of a Lunar image by using an edge detector, detecting ridges in the image gradient by applying a Hough Transform to detect straight lines in the image gradient, and registering the image. In some embodiments, the method can include applying a watershed segmentation algorithm to the image gradient to extract object features of the image. The applying a watershed segmentation algorithm can include segmenting regions that appear as close contours in the gradient. In some embodiments, the edge detector can include a Canny edge detector. The method can further include detecting object features in the image, for example, rock features, crater features, ridges, or the like. In some embodiments, the method can further include preprocessing the image to smooth noise in the image prior to computing the image gradient. The registering can include registering the detected ridges with ridges shown in a reference image.

According to various embodiments, a feature extraction method is provided that includes computing an image gradient of an image by using an edge detector, applying a watershed segmentation algorithm to the image gradient to extract first objects such as small rocks, applying a generalized Hough Transform to detect ellipses in the image gradient, and applying a watershed segmentation algorithm to the image gradient using the detected ellipses as seed points, for example, to extract objects and recesses of elliptical shape, such as elliptical rocks and craters. The method can further include detecting ridges in the image gradient by applying a Hough Transform to detect straight lines in the image gradient, and distinguishing one or more objects in the image from a background of the image. The edge detector can include a Canny edge detector. The image can include a Lunar image.

In some embodiments, the method can further include preprocessing the image to smooth noise in the image prior to computing the image gradient. The method can also include registering one or more of the detected objects with one or more objects in a reference image.

According to various embodiments, the registering can include extracting features from both the input image and reference image and computing a geometric transformation between the image and the reference image based on these features. In some embodiments, the registering can include: extracting features from the reference image; extracting features from the input image; matching features between the input image and the reference image; estimating a transformation model; transforming the input image with respect to the reference image; and generating a registered image. The generated registered image can be displayed, output, printed, written to a memory device, or a combination thereof. A processor can be used to carry out one or more of the extracting, the matching, the estimating, the transforming, and the generating. In some embodiments, a processor can be used to carry out two or more, three or more, or each of the extracting, the matching, the estimating, the transforming, and the generating. In some embodiments, the method can further include printing out the registered image, displaying the registered image, or the like.

According to yet other embodiments of the present teachings, an image feature extraction system is provided that includes an edge detector, a processor, or both, for example, a processor having an edge detector software program installed therein. The processor can be configured to compute an image gradient of an image by using the edge detector. The processor can be configured to apply a watershed segmentation algorithm to the image gradient to extract first objects. The processor can be configured to apply a generalized Hough Transform to detect ellipses in the image gradient. The processor can be configured to apply a watershed segmentation algorithm to the image gradient using the detected ellipses as seed points, to extract objects and recesses of elliptical shape. The processor can be configured to detect ridges in the image gradient by applying a Hough Transform to detect straight lines in the image gradient. In some embodiments, the processor can be configured to distinguish one or more objects in the image from a background of the image.

In some embodiments, the system can include a Hough accumulator, a generalized Hough accumulator, or a combination thereof. The system can include a Canny edge detector and the processor can be configured to compute the image gradient of the image using the Canny edge detector. The system can further include a camera configured to acquire the image, for example, configured to acquire a Lunar image. In some embodiments, the camera can be on board a spacecraft orbiting a planet, and the images can be of the surface of the planet. The processor can be configured to preprocess the image to smooth noise in the image. In some embodiments, the system can further include a preprocessor configured to preprocess the image to smooth noise in the image.

According to various embodiments, a method for extraction of Lunar features from Lunar images that show the surface of the moon and its structures, is provided. While Lunar features are specified, it is to be understood that the method can also be applied to other planetary features. According to various embodiments, the method can enable automatic detection of structures that are present in a represented Lunar surface. The method can include extracting features and using the extracted features to register multitemporal, multisensor, and stereo-images. Different types of features can be present in the images. According to various embodiments, the features to be extracted can include rocks, craters, boulders, and/or ridges. Rocks are objects of small elliptical or circular shape, with no shadows. Craters have approximately elliptical shape with shadows, due to their depth and uneven illumination. Ridges appear like curves and straight lines in the images. The size, shape and position of the planetary images can be estimated by applying different methods, which are described herein. Once the features are extracted they can be applied to register image pairs, representing the same scene. As described in more detail herein, a genetic algorithm can be used to assess the transformation between the images to be registered.

Given a pair of images to be registered (i.e., an input and a reference images), their features can be extracted and used to estimate the optimum transformation. Once the transformation parameters are assessed, the transformation parameters can be used to register the input image with respect to the reference one. A flowchart of an exemplary technique is shown in FIG. 1. As can be seen, features are extracted from both the input and the reference images (IN and REF, respectively). The extracted features are used in an optimization module, aimed at computing the optimum transformation. Once the transformation parameters are estimated, they can be used to transform IN with respect to REF and generate the registered image, REG.

While extraction of features from lunar images is described herein, it should be understood that the methods described herein can apply to planetary features and planetary images as well. For example, the method for extraction of features can be used for planetary image registration, landing site selection, hazard map creation and more generally for lunar and planetary terrain categorization. The method for extraction of features can further be used to supplement existing feature extraction methods already in use for Earth remote sensing, military and medical applications. In particular, the method can be useful for applications, such as, feature extraction in SAR images for military applications, and/or feature extraction in medical images with low contrast (e.g., mammograms in MRIs).

Feature Extraction

According to various embodiments, the feature extraction method can include one or more image processing techniques. According to some embodiments, the image processing technique can include segmentation. The term "segmentation," as used herein, can refer to a process of partitioning an image into multiple regions, for instance, in order to distinguish objects from the background. According to some embodiments, segmentation can involve introducing a set of characteristic points that are related to the objects to be detected, automatically selected, and used as "seed points" to segment the images. Various approaches to segmentation can be used, for example, region growing, and/or, watershed transformation.

According to various embodiments, the feature extraction method can include segmentation. According to some embodiments, the segmentation can include, for example, watershed segmentation, Hough Transform, and/or the Generalized Hough Transform.

According to various embodiments, watershed segmentation can solve the problem of over-segmentation and can utilize good seed points from which regions can be extracted. The Generalized Hough Transform can be used to extract ellipses to define these seed points. The watershed algorithm which can be used is described in S. Beucher, "The Watershed Transformation applied to Image Segmentation," Scanning Microscopy International, 6, 1992, the contents of which are incorporated by reference in their entirety, herein. The watershed algorithm is an automatic, robust, and fast method. The Generalized Hough Transform is described in S. Tsuji, F. Matsumoto, "Detection of Ellipses by a Modified Hough Transformation," IEEE Trans. on Computers, 27(8), 1978, which is incorporated in its entirety herein by reference.

According to various embodiments, before applying the feature extraction method, the images can be preprocessed. First, according to some embodiments, any noise that is present can be smoothed by applying a Gaussian filtering and a median filtering operation in cascade, as described, for example, in Shapiro, L. G. & Stockman, G. C: "Computer Vision", Prentice Hall, 2001, which is incorporated herein in its entirety by reference.

According to some embodiments, in order to detect the edges, the image gradient can be computed by using the Canny edge detector, described, for example, in J. Canny, "A Computational Approach to Edge Detection," IEEE-Trans. Pattern Analysis & Machine Intelligence, 10(6), 1986, which is incorporated herein in its entirety by reference. According to some embodiments, both a gray scale image and a binary gradient can be obtained and used. According to some embodiments, as an intermediate result of this operation, an intensity gradient $I_g$ can be generated, which can be a gray-scale image. According to some embodiments, by applying a non-maximum suppression algorithm followed by a hysteresis thresholding to $I_g$, a binary gradient image, $I_b$, showing the contours of the objects represented in the original image, can be obtained.

According to various embodiments, in order to extract rocks, which can appear like close contours in the gradient image, the watershed algorithm can be applied to $I_b$, in order to segment regions with close contours. According to some embodiments, all the area included within a close contour can be a "seed point-area", and can be identified as a region. The result of this first step can be a binary image that shows the rock boundaries.

While rocks can appear like close contours and can be easily detected, according to some embodiments, craters can have a more complex structure and, due to their depth and uneven illumination, can exhibit shadows. Their borders can be approximated with incomplete non-continuous elliptical curves. According to various embodiments, a generalized Hough accumulator, as described in S. Tsuji, F. Matsumoto, "Detection of Ellipses by a Modified Hough Transformation," IEEE Trans. on Computers, 27(8), 1978, which is incorporated in its entirety herein by reference, can be used to identify the seed points to detect these structures from $I_b$. For every pair of points that are detected as edge points in $I_b$ and exhibit opposite gradient direction, an accumulator, corresponding to the median point between them, can be incremented of a unit value. In other words, for each edge point pair with opposite gradient direction, an accumulator, corresponding to the median point between them, can be incremented. According to some embodiments, the maxima of the accumulator can be taken as centers of the ellipses. The parameters describing each ellipse centered in the detected maxima can then be assessed. According to some embodiments, a 3D accumulator can be used to estimate the two ellipse semi-axes and the rotation angle from all the pairs of points that contributed to the accumulator in the considered center. If the ellipse that has been generated truly corresponds to a contour in the gradient image, its center can be used as a seed point for segmentation. According to some embodiments, starting from all the detected seed points, a watershed algorithm can be applied to $I_g$ and the craters can be identified. As a result, a binary image that shows the crater boundaries can be obtained. According to some embodiments, a standard Hough accumulator can further be applied to detect straight lines in $I_g$. A standard Hough accumulator can be as described, for example, in R. Duda and P. Hart, "Use of the Hough Transform to Detect Lines and Curves in Pictures," Communications of the Association for Computing Machinery, 15, 1972, which is incorporated in its entirety herein by reference.

According to various embodiments, ridges can be detected as unions of short linear segments. According to some embodiments, a binary image that represents the contours of all detected features, can be created and used in the registration process.

According to various embodiments, MATLAB can be used to develop computer code for implementing the methods described herein. In some embodiments, the watershed segmentation and the standard Hough Transform can use open source software. The generalized Hough transform can be loosely based on published algorithms.

Registration

According to various embodiments, once features are extracted, they can be applied to register image pairs representing the same scene. Image registration, as used herein, can refer to a process of spatially aligning a pair of images. The pair of images can include an input image and a reference image. According to some embodiments, image registration can include a global optimization technique that is used to maximize the matching between features extracted from the images to be registered. Systems that evaluate and compare images, require image registration as an intermediate step. Images can be taken from different sensors, at different times, from different view-points. Registration steps can include feature detection, feature matching, transformation model estimation, and image transformation. Feature detection can include manual or automatic detection of salient or distinctive objects. Feature matching can include establishing correspondence between features. Transformation model estimation can include estimating a type of model and parameters of the mapping function. Image transformation can include transforming the input image.

According to various embodiments, the feature extraction method can be applied to various registration approaches, including the basic approach, the point-based registration, and the region-based registration. The basic approach can include cross-correlation of gray-levels to obtain the measure of similarity between images. The point-based registration can include extracting and using peculiar points, for example, maxima or minima wavelet coefficients, to perform matching.

According to various embodiments, the features described above can be extracted from the pair of images (input and reference) to be registered, and mapped into two binary images. Such binary images can be matched in order to compute the geometric transformation required to achieve the registration. According to some embodiments, the optimization scheme can include feeding binary images as inputs to an optimization module. The transformation matrix can be optimized, such that the evaluation can be performed using an objective function and the optimization can be achieved by applying a genetic algorithm. After the optimum matrix has been estimated, it can be applied on the input image, for example, which can be translated and interpolated to obtain a final registered image.

According to various embodiments, the feature extraction method can be applied to region-based image registration. According to some embodiments, the features described above can be extracted from the pair of images to be registered, $I_{in}$ and $I_{ref}$, and mapped into two binary images, $I_A$ and $I_B$, respectively. According to some embodiments, such binary images can then be matched to compute the geometric transformation required to achieve the registration. According to some embodiments, registration can be based on a global optimization technique aimed at estimating the optimum parameters of an image transformation model. According to some embodiments, the binary images, which represent the features of $I_{in}$ and $I_{ref}$, can be fed as inputs to an optimization module. According to some embodiments, the transformation matrix can be optimized: its quality can be evaluated by an objective function and its optimization can be achieved by applying a genetic algorithm. According to some embodiments, after the optimum matrix has been estimated, it can be applied to one of the two images, which can be translated and interpolated in order to obtain the final registered image.

According to various embodiments, the problem can be formulated as determining a transformation T* such that, when T* is applied to the first image, $I_A$, the best match with the second one, $I_B$ is achieved. The match can be calculated as the correlation between the binary image extracted from the transformed input image and from the reference image. The objective function to be maximized is:

$$MOM(T) = \frac{1}{n} \sum_{(x,y): I_B(x,y) \neq 0} I_A(T(x, y)). \qquad 1$$

where MOM (measure of match) denotes the objective function, T is the transformation for the x and y coordinates in the image plane, and n is the number of nonzero pixels of $I_B$. According to some embodiments, an affine transformation model, which exhibits six independent parameters, can be employed. The determination of the transformation parameters can strongly depend on the objective function, as well as on the planetary images to be registered. According to some embodiments, where the function has multiple extremes, the most attractive search methods can be based on global optimization techniques. According to some embodiments, a genetic algorithm (GA) can be adopted, since it ensures, under mild assumptions, convergence to a global maximum of the adopted matching functional. The genetic algorithm can be as described in Z. Michalewicz, Genetic Algorithms+Data Structures=Evolutional Programs, Springer Verlag, Berlin Heidelberg, third edition, 1999, which is incorporated herein in its entirety by reference. According to some embodiments, the six independent parameters of T can be defined over a wide range of values to achieve robustness. The aim of the GA can be to find the value for such parameters, which maximize the objective function. Given this, the final transformation matrix can be calculated by decoding the fittest individual of the last population, and the input image can be registered.

For a description of other systems, methods, and/or apparatus, that can be implemented in accordance with various embodiments of the present teachings, reference is made to Y. Sawabe, T. Matsunaga, and S. Rokugawa, "Automated detection and classification of lunar craters using multiple approaches," *Adv. Space Res.*, vol. 37, no. 1, pp. 21-27, 2006; J. Earl, A. Chicarro, C. Koeberl, P. G. Marchetti, and M. Milsen, "Automatic recognition of crater-like structures in terrestrial and planetary images," in *Proc. Lunar Planetary Sci. XXXVI*, Houston, Tex., 2005, Abs. No. 1319; and "Lunar reconnaissance Orbiter", NASA Facts. Goddard Space Flight Center, National Aeronautics and Space Administration, http://lro.gsfc.nasa.gov/mission.html; each of which is incorporated herein in its entirety by reference. The present teachings are further illustrated with reference to the following examples which are intended to exemplify, not limit, the present teachings.

EXAMPLES

Experiments were carried out using data similar to that expected from LRO images but collected during the mission Mars Odyssey. Five bands visible images and ten bands thermal infrared images from the THEMIS (Thermal Emission Imaging System) instrument, with a resolution of 18 meters and 100 meters per pixel respectively, were used to test a method according to an embodiment of the present teachings.

Figure 2B:
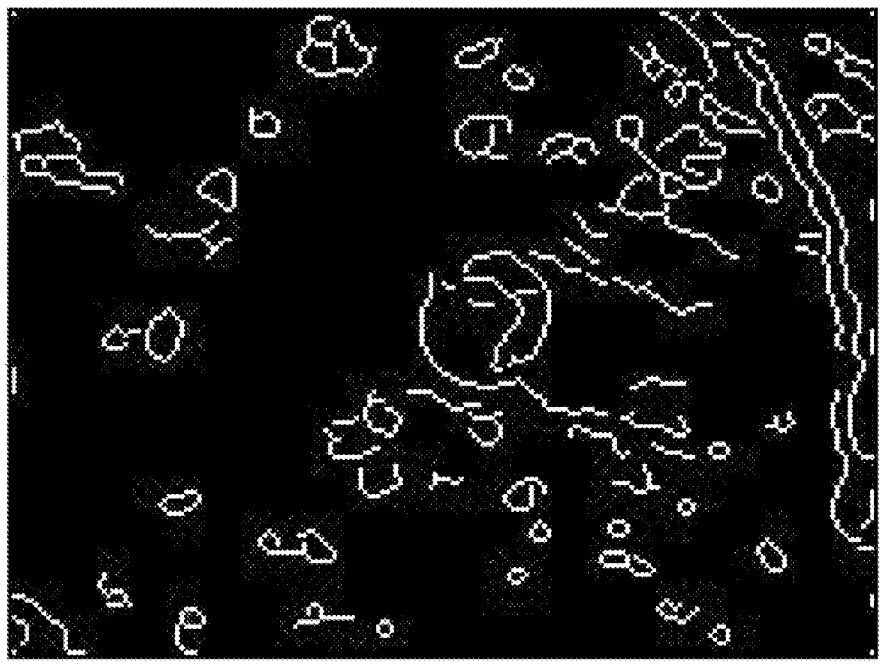
FIG. 2B shows an image of Canny Gradient of the image shown in FIG. 2A.
Figure 2A:
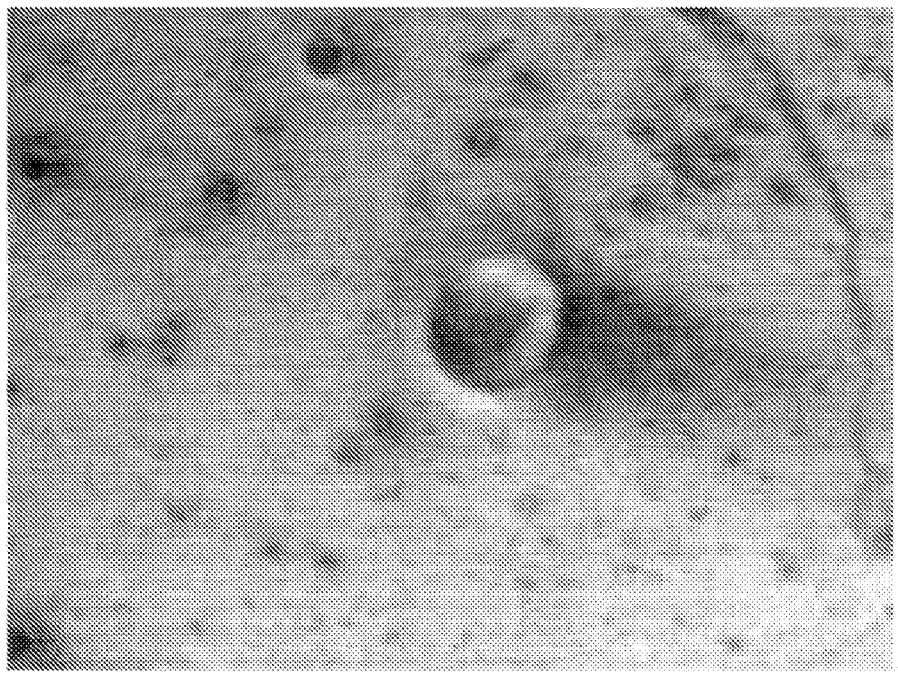
FIG. 2A shows a partition of an infrared image.
Figure 2D:
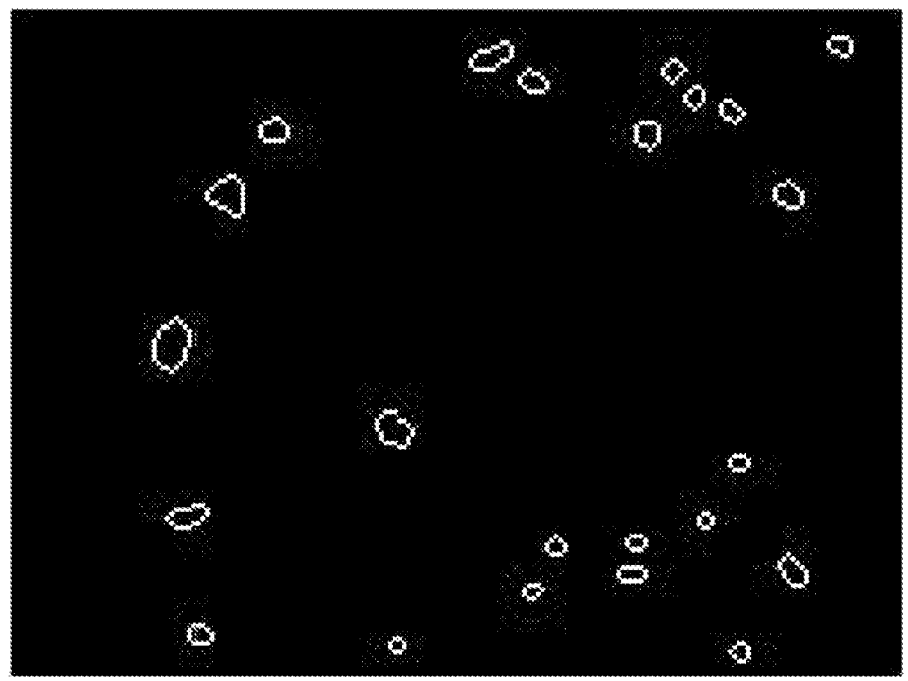
FIG. 2D shows an image of Canny Gradient with close contours extracted.
Figure 2C:
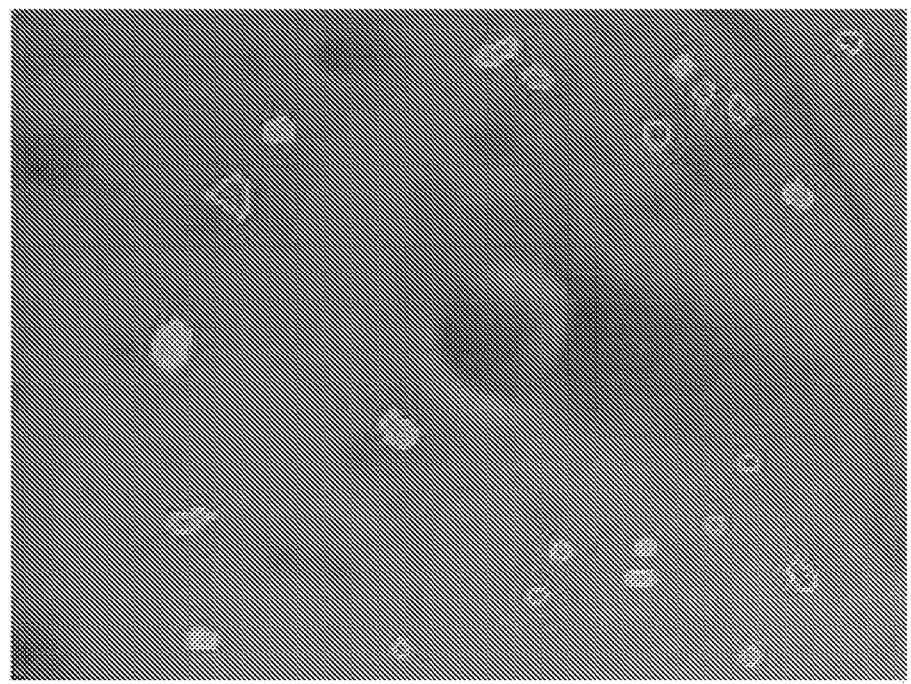
FIG. 2C shows an image of segmented Canny Gradient.
Figure 2F:
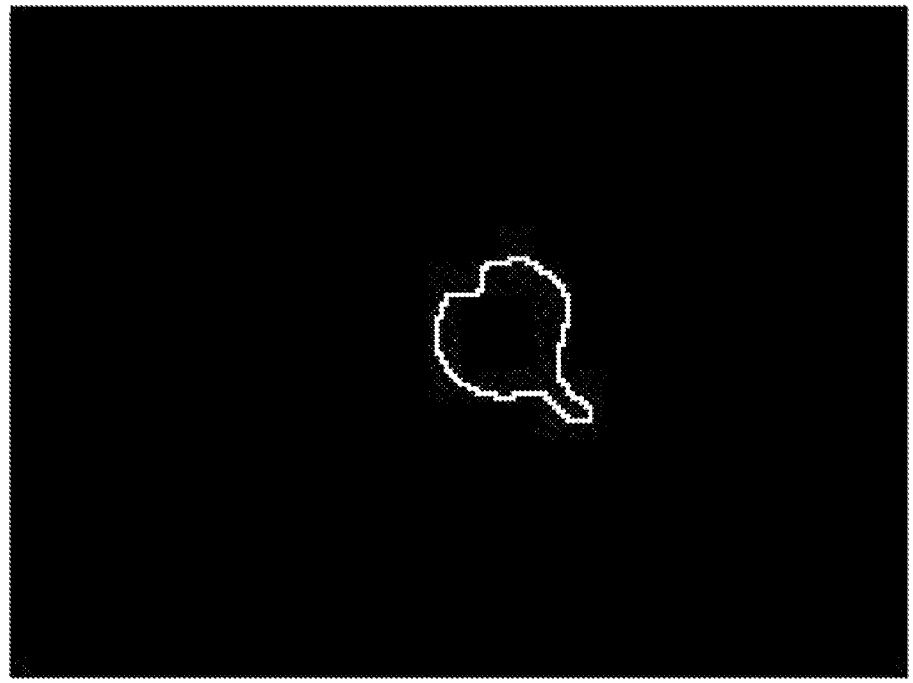
FIG. 2F shows a binary image in which crater boundaries are mapped.
Figure 2E:
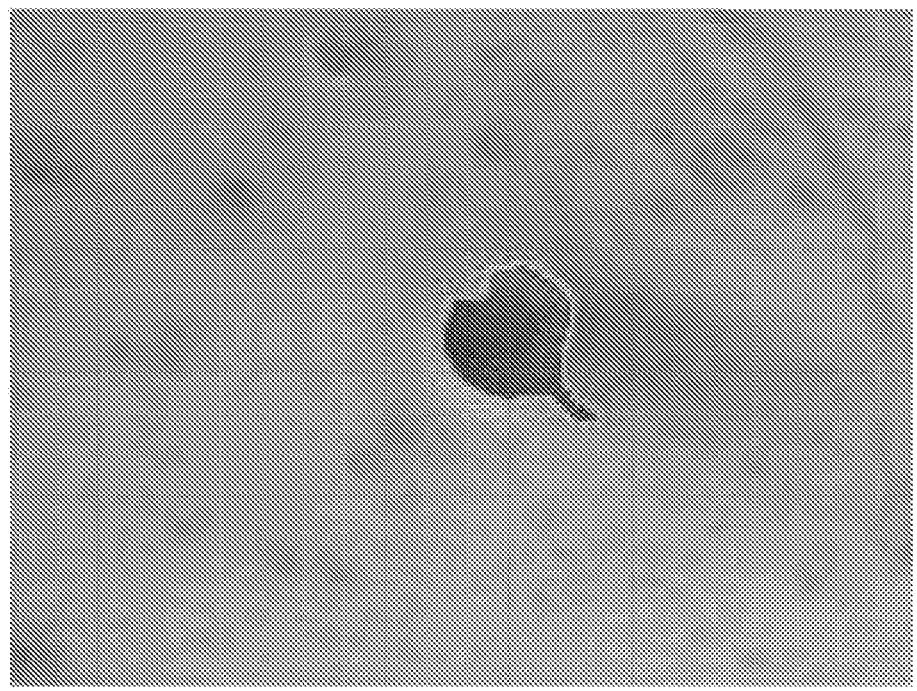
FIG. 2E shows the resulting image after the segmentation (initialized with the maxima of the Hough accumulator) is applied.

FIGS. 2A-2F shows results of a feature extraction method for a partition of the first band of an infrared image. The input image, shown in FIG. 2A, was first preprocessed, in order to smooth the noise. Canny gradient was applied to the smoothed image and results are shown in FIG. 2B. Subsequently, a watershed algorithm was applied in order the extract the rocks. Segmentation results and the extracted rock boundaries are shown in FIGS. 2C and 2D, respectively. Finally, the generalized Hough transform was computed and a watershed segmentation was applied, which started the flooding process from the ellipse centers and allowed the craters to be detected. The segmentation results and the crater boundaries are shown in FIGS. 2E and 2F, respectively.

Figure 3B:
FIG. 3B shows a reference image.
Figure 3A:
FIG. 3A shows an input image.
Figure 3D:
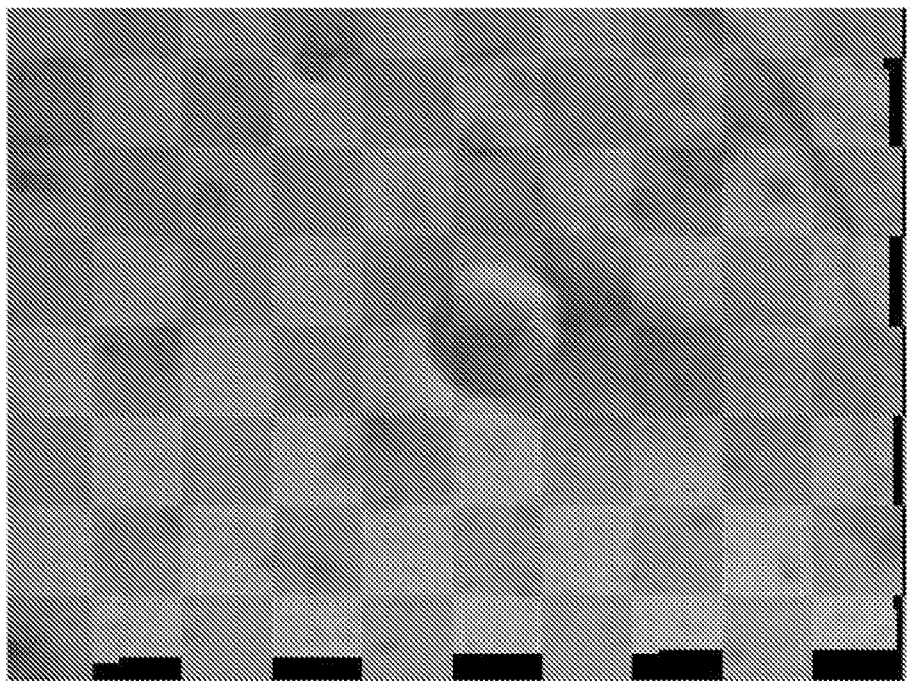
FIG. 3D shows registered images by using a checkerboard representation.
Figure 3C:
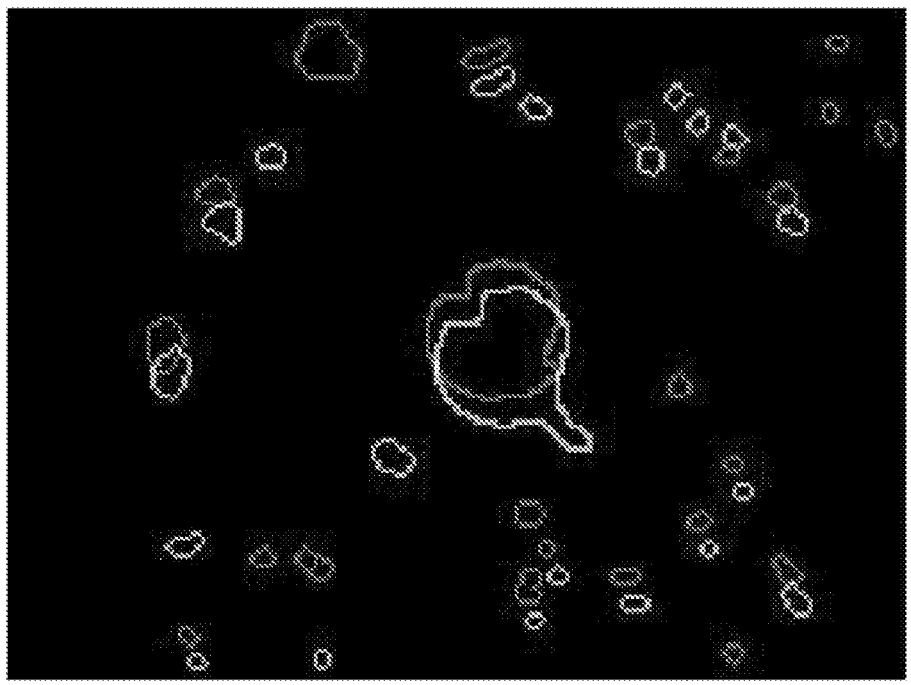
FIG. 3C shows superimposed unregistered image boundaries.

To demonstrate the applicability of the method to registration, two different non-registered bands of an infrared image were used. In order to show the results, the same partition of FIG. 2A was used. Results are shown in FIGS. 3A-3D. In FIGS. 3A and 3B, the fourth and fifth bands were used. The rotation and translation between the two different bands are visible in FIG. 3C, in which two non-registered contour images are superimposed in a gray-scale representation. The contours extracted from the fourth band image are represented in white whereas the fifth-band contours are shown in gray. Finally, the transformation parameters are estimated by the method and the co-registered images are shown in FIG. 3D, by using a checkerboard filter, that is, each check of the board represents the registered input image and the reference image, alternately. The registration accuracy can be evaluated by looking at the continuity of the image features at the borders of the checks. The visual analysis of FIG. 3D shows that the registration performed well; craters and ridges appear continuous at the check borders, or points of overlap.

Other embodiments of the present invention will be apparent to those skilled in the art from consideration of the present specification and practice of the present invention disclosed herein. It is intended that the present specification and examples be considered as exemplary only with the true scope and spirit of the invention being indicated by the following claims and equivalents thereof.

What is claimed is:

1. A feature extraction method, the method comprising:
computing an image gradient of a Lunar image by using an edge detector;
detecting features in the image gradient by applying a Hough Transform to the image gradient;
at least one of mapping the features to generate a map, printing the features to generate a printout, and using the detected features to register the Lunar image and generate a registered Lunar image; and
applying a watershed segmentation algorithm to the image gradient and registering the Lunar image against an image of an object to extract an object feature of the Lunar image.

2. The method of claim 1, wherein the features detected are ridges and the applying a Hough Transform comprises using a standard Hough accumulator.

3. The method of claim 1, wherein the edge detector comprises a Canny edge detector.

4. The method of claim 1, wherein the method comprises using the detected features to register the image and generate a registered image.

5. The method of claim 1, the method further comprising:
preprocessing the Lunar image and the image of an object to smooth noise in the pair of images prior to computing the image gradient.

6. The method of claim 1, wherein the registering comprises registering the image to a reference image.

7. A feature extraction method, the method comprising:
computing an image gradient of an image by using an edge detector;
applying a watershed segmentation algorithm to the image gradient to extract first objects;
applying a generalized Hough Transform to detect ellipses in the image gradient;
applying a watershed segmentation algorithm to the image gradient using the detected ellipses as seed points, to extract second objects and recesses of elliptical shape;
detecting ridges in the image gradient by applying a standard Hough Transform to detect straight lines in the image gradient; and
distinguishing one or more second objects in the image from a background of the image.

8. The method of claim 7, wherein the edge detector comprises a Canny edge detector.

9. The method of claim 7, wherein the image comprises a Lunar image.

10. The method of claim 7, the method further comprising:
preprocessing the image to smooth noise in the image prior to computing the image gradient.

11. The method of claim 7, the method further comprising:
registering the image with one or more reference images.

12. The method of claim 11, wherein the registering comprises extracting features from the reference image and computing a geometric transformation between the image and the reference image.

13. The method of claim 11, wherein the registering comprises:
extracting features from the reference image;
matching features between the image and the reference image;
estimating a transformation model;
transforming the image with respect to the reference image; and
generating a registered image.

14. The method of claim 13, wherein a processor is used to carry out one or more of the extracting, the matching, the estimating, the transforming, and the generating.

15. The method of claim 13, wherein a processor is used to carry out each of the extracting, the matching, the estimating, the transforming, and the generating.

16. The method of claim 13, the method further comprising:
printing out the registered image.

17. The method of claim 13, the method further comprising:
   displaying the registered image.

18. An image feature extraction system, the system comprising:
   a processor configured to
      compute an image gradient of an image by using an edge detector,
      apply a watershed segmentation algorithm to the image gradient to extract first objects,
      apply a generalized Hough Transform to detect ellipses in the image gradient,
      apply a watershed segmentation algorithm to the image gradient using the detected ellipses as seed points, to extract second objects and recesses of elliptical shape,
      detect ridges in the image gradient by applying a Hough Transform to detect straight lines in the image gradient, and
      distinguish one or more second objects in the image from a background of the image.

19. The system of claim 18, the system further comprising:
   a Canny edge detector, wherein the processor is configured to compute the image gradient of the image using the Canny edge detector.

20. The system of claim 18, the system further comprising:
   a camera configured to acquire the image.

21. The system of claim 18, the system further comprising:
   a preprocessor configured to preprocess the image to smooth noise in the image.

* * * * *